US012367862B2

(12) United States Patent
Erdenee et al.

(10) Patent No.: US 12,367,862 B2
(45) Date of Patent: Jul. 22, 2025

(54) METHOD OF GENERATING RESPONSE USING UTTERANCE AND APPARATUS THEREFOR

(71) Applicant: Hyperconnect LLC, Seoul (KR)

(72) Inventors: Enkhbayar Erdenee, Seoul (KR); Beom Su Kim, Seoul (KR); Sang Bum Kim, Seoul (KR); Seok Jun Seo, Seoul (KR); Jin Yong Yoo, Seoul (KR); Bu Ru Chang, Seoul (KR); Seung Ju Han, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 363 days.

(21) Appl. No.: 18/046,455

(22) Filed: Oct. 13, 2022

(65) Prior Publication Data

US 2023/0154453 A1    May 18, 2023

(30) Foreign Application Priority Data

Nov. 15, 2021   (KR) .................. 10-2021-0157067
Jul. 1, 2022    (KR) .................. 10-2022-0081325

(51) Int. Cl.
*G10L 15/02*     (2006.01)
*G06F 40/20*     (2020.01)

(52) U.S. Cl.
CPC ........... *G10L 15/02* (2013.01); *G06F 40/20* (2020.01)

(58) Field of Classification Search
CPC .................. G10L 15/02; G06F 40/20
See application file for complete search history.

(56) References Cited

U.S. PATENT DOCUMENTS

| 6,571,234 | B1 | 5/2003 | Knight et al. |
| 6,731,307 | B1 | 5/2004 | Strubbe et al. |
| 6,735,615 | B1 | 5/2004 | Iwayama et al. |
| 6,804,647 | B1 | 10/2004 | Heck et al. |
| 6,804,675 | B1 | 10/2004 | Knight et al. |
| 7,277,855 | B1 | 10/2007 | Acker et al. |
| 7,685,237 | B1 | 3/2010 | Weaver et al. |
| 10,176,819 | B2 | 1/2019 | Sun et al. |

(Continued)

FOREIGN PATENT DOCUMENTS

| CN | 112541060 A | 3/2021 |
| JP | 2003202885 A | 7/2003 |

(Continued)

OTHER PUBLICATIONS

European Patent Application 22207004.7 dated Mar. 3, 2023, 9 pgs.

(Continued)

*Primary Examiner* — Ibrahim Siddo
(74) *Attorney, Agent, or Firm* — Patent Capital Group

(57) ABSTRACT

Systems and techniques to generate imitative responses are illustrated. response generation method performed in an electronic apparatus of the present disclosure includes acquiring at least one piece of utterance data, acquiring a first context corresponding to the utterance data from a context candidate set, generating one or more dialogue sets including the first context and the utterance data, receiving a second context from a user, and acquiring a response corresponding to the second context using a language model based on the one or more dialogue sets.

13 Claims, 7 Drawing Sheets

(56) References Cited

U.S. PATENT DOCUMENTS

| | | |
|---|---|---|
| 10,930,263 B1 | 2/2021 | Mahyar |
| 11,081,104 B1 | 8/2021 | Su et al. |
| 11,418,461 B1 | 8/2022 | Elfardy et al. |
| 11,615,777 B2 | 3/2023 | Ahn et al. |
| 11,645,547 B2 | 5/2023 | Tian et al. |
| 2002/0120450 A1 | 8/2002 | Junqua et al. |
| 2004/0111271 A1 | 6/2004 | Tischer |
| 2005/0144247 A1 | 6/2005 | Christensen et al. |
| 2006/0149558 A1 | 7/2006 | Kahn et al. |
| 2006/0210034 A1 | 9/2006 | Beadle et al. |
| 2006/0235932 A1 | 10/2006 | Celi, Jr. et al. |
| 2007/0005754 A1 | 1/2007 | Horvitz et al. |
| 2007/0071206 A1 | 3/2007 | Gainsboro et al. |
| 2008/0082333 A1 | 4/2008 | Nurminen et al. |
| 2008/0147385 A1 | 6/2008 | Nurminen et al. |
| 2008/0183473 A1 | 7/2008 | Nagano et al. |
| 2008/0207242 A1 | 8/2008 | Ekberg |
| 2008/0235024 A1 | 9/2008 | Goldberg et al. |
| 2009/0037179 A1 | 2/2009 | Liu et al. |
| 2009/0171657 A1 | 7/2009 | Tian et al. |
| 2009/0177473 A1 | 7/2009 | Aaron et al. |
| 2009/0204510 A1 | 8/2009 | Hwang |
| 2010/0161327 A1 | 6/2010 | Chandra et al. |
| 2012/0189272 A1 | 7/2012 | Kunigita et al. |
| 2012/0226500 A1 | 9/2012 | Balasubramanian et al. |
| 2013/0332167 A1 | 12/2013 | Kilgore |
| 2014/0195227 A1 | 7/2014 | Rudzicz et al. |
| 2014/0303958 A1 | 10/2014 | Lee et al. |
| 2015/0379654 A1 | 12/2015 | Deshmukh et al. |
| 2016/0005403 A1 | 1/2016 | Agiomyrgiannakis et al. |
| 2016/0036962 A1 | 2/2016 | Rand |
| 2016/0104474 A1 | 4/2016 | Bunn et al. |
| 2016/0203827 A1 | 7/2016 | Leff et al. |
| 2016/0379643 A1 | 12/2016 | Ito et al. |
| 2017/0171509 A1 | 6/2017 | Huang et al. |
| 2017/0171599 A1 | 6/2017 | Peng |
| 2017/0249953 A1 | 8/2017 | Yassa et al. |
| 2017/0301340 A1 | 10/2017 | Yassa et al. |
| 2018/0048865 A1 | 2/2018 | Taylor et al. |
| 2018/0063556 A1 | 3/2018 | Kalmanson et al. |
| 2018/0090126 A1 | 3/2018 | Peterson et al. |
| 2018/0130471 A1 | 5/2018 | Trufinescu et al. |
| 2018/0204576 A1 | 7/2018 | Dhoot et al. |
| 2018/0316964 A1 | 11/2018 | Dillon et al. |
| 2019/0044985 A1 | 2/2019 | Jo et al. |
| 2019/0079941 A1 | 3/2019 | Sarkar et al. |
| 2019/0108242 A1 | 4/2019 | Liu et al. |
| 2019/0155905 A1 | 5/2019 | Bachrach et al. |
| 2019/0221225 A1 | 7/2019 | Bricklin et al. |
| 2019/0251952 A1 | 8/2019 | Arik et al. |
| 2019/0334842 A1 | 10/2019 | Sato |
| 2019/0354594 A1* | 11/2019 | Foster ............... G06N 3/044 |
| 2020/0013422 A1 | 1/2020 | Matkin |
| 2020/0082807 A1 | 3/2020 | Kim et al. |
| 2020/0197810 A1 | 6/2020 | Kung et al. |
| 2020/0265829 A1 | 8/2020 | Liu et al. |
| 2020/0279017 A1 | 9/2020 | Norton et al. |
| 2020/0395008 A1* | 12/2020 | Cohen ............... G06F 40/268 |
| 2021/0020161 A1 | 1/2021 | Gao |
| 2021/0043187 A1 | 2/2021 | Ahn et al. |
| 2021/0217404 A1 | 7/2021 | Jia et al. |
| 2022/0083744 A1 | 3/2022 | Li et al. |
| 2022/0092651 A1 | 3/2022 | Sureshkumar et al. |
| 2022/0199068 A1 | 6/2022 | Ahn et al. |
| 2022/0246136 A1 | 8/2022 | Yang et al. |
| 2022/0269934 A1 | 8/2022 | Song |
| 2022/0277141 A1 | 9/2022 | Nijkamp et al. |
| 2022/0328038 A1 | 10/2022 | Otani et al. |
| 2022/0382978 A1 | 12/2022 | Wagner et al. |
| 2023/0077528 A1 | 3/2023 | Erdenee et al. |
| 2023/0080930 A1 | 3/2023 | Seo et al. |
| 2023/0215418 A1 | 7/2023 | Ahn et al. |
| 2023/0229864 A1 | 7/2023 | Kim et al. |
| 2023/0229964 A1 | 7/2023 | Kim et al. |
| 2024/0131439 A1 | 4/2024 | Kim et al. |

FOREIGN PATENT DOCUMENTS

| | | |
|---|---|---|
| JP | 2019179257 A | 10/2019 |
| JP | 2020160319 A | 10/2020 |
| KR | 20000036463 A | 7/2000 |
| KR | 20010091677 A | 10/2001 |
| KR | 20090028151 A | 3/2009 |
| KR | 101632435 B1 | 6/2016 |
| KR | 20170107683 A | 9/2017 |
| KR | 20180059322 A | 6/2018 |
| KR | 20190008137 A | 1/2019 |
| KR | 20190085882 A | 7/2019 |
| KR | 10-2170563 B1 | 10/2020 |
| KR | 10-2173553 B1 | 11/2020 |
| WO | 2018074516 A1 | 4/2018 |
| WO | 2019139430 A1 | 7/2019 |
| WO | 2019222591 A1 | 11/2019 |

OTHER PUBLICATIONS

Fu et al., "Stylistic Retrieval-based Dialogue System with Unparallel Training Data", arXiv:2109.05477, Sep. 12, 2021, 9 pages.

Han et al., "Meet Your Favorite Character: Open-domain Chatbot Mimicking Fictional Characters with only a Few Utterances", arXiv:2204.10825, Apr. 22, 2022, 19 pages.

Extended European Search Report for Application No. 20189677.6, Dated Sep. 28, 2020, 9 pgs.

Extended European Search Report for Application No. 22189981.8, mailed Jan. 17, 2023, 9 pgs.

Japanese Office Action for Application No. 2020-134046, Dated Sep. 10, 2021, 8 pgs.

Korean Office Action for Application No. 10-2019-0097398, Dated Aug. 18, 2021, 15 pgs.

Korean Office Action for Application No. 10-2019-0097398, Dated Jun. 25, 2020, 11 pgs.

Office Action for Japanese Patent Application No. 2021-083959 dated Sep. 28, 2022, 2 pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005.14165v4 [cs.CL], Jul. 22, 2020, 75 pgs.

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Choi et al., "Attentron: Few-Shot Text-to-Speech Utilizing Attention-Based Variable-Length Embedding", ArXiv abs/2005.08484, Aug. 12, 2020 (Version 2), 5 pgs.

Choi et al., "Attentron: Few-Shot Text-to-Speech Utilizing Attention-Based Variable-Length Embedding", ArXiv abs/2005.08484, May 18, 2020 (Version 1), 5 pgs.

Cooper et al., "Zero-Shot Multi-Speaker Text-To-Speech With State-Of-The-Art Neural Speaker Embeddings", IEEE International Conference on Acoustics, Speech and Signal Processing (ICASSP), 2020, arXiv:1910.10838v2, Feb. 4, 2020, 5 pgs., doi: 10.1109/ICASSP40776.2020.9054535.

Fan et al., "Augmenting Transformers with KNN-Based Composite Memory for Dialog", Transactions of the Association for Computational Linguistics, vol. 9, Mar. 1, 2021, pp. 82-99, doi: 10.1162/tacl_a_00356.

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029, doi: 10.18653/v1/2021.naacl-main.240.

Guu et al., "Realm: Retrieval-Augmented Language Model Pre-Training", Proceedings of the 37th International Conference on Machine Learning (ICML'20), vol. 119. JMLR.org, Article 368, 2020, arXiv:2002.08909v1 [cs.CL], Feb. 10, 2020, 12 pgs.

(56) References Cited

OTHER PUBLICATIONS

Holtzman et al., "The Curious Case of Neural Text Degeneration", International Conference on Learning Representations (ICLR), 2020, arXiv:1904.09751v2 [cs.CL], Feb. 14, 2020, 16 pgs.

Hsu et al., "Hierarchical generative modeling for controllable speech synthesis", International Conference on Learning Representations (ICLR), 2019, arXiv preprint arXiv:1810.07217v2, Dec. 27, 2018, 27 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373, doi: 10.18653/v1/2021.findings-emnlp.286.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lee et al., "Robust and Fine-Grained Prosody Control of End-To-End Speech Synthesis", IEEE International Conference on Acoustics, Speech and Signal Processing (ICASSP), 2019, arXiv:1811.02122v2, Feb. 18, 2019, 5 pgs., doi: 10.1109/icassp.2019.8683501.

Lewis et al., "Retrieval-Augmented Generation for Knowledge-Intensive NLP Tasks", Proceedings of the 34th International Conference on Neural Information Processing Systems (NIPS), 2020, arXiv:2005.11401v4 [cs.CL], Apr. 12, 2021, 19 pgs.

Li et al., "A Diversity-Promoting Objective Function for Neural Conversation Models", Proceedings of the 2016 Conference of the North American Chapter of the Association for Computational Linguistics: Human Language Technologies, 2016, San Diego, California, Jun. 12-17, 2016, pp. 110-119, doi:10.18653/v1/N16-1014.

Li et al., "Don't Say That! Making Inconsistent Dialogue Unlikely with Unlikelihood Training", Proceedings of the 58th Annual Meeting of the Association for Computational Linguistics, Jul. 2020, arXiv:1911.03860v2 [cs.CL], May 6, 2020, 15 pgs., doi: 10.18653/v1/2020.acl-main.428.

Liu et al., "How Not to Evaluate Your Dialogue System: An Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", Proceedings of the Conference on Empirical Methods in Natural Language Processing, Oct. 31,-Nov. 4, 2018, arXiv:1809.01984v1 [cs.CL], Sep. 6, 2018, 5 pgs.

Papineni et al., "Bleu: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for building an open-domain chatbot", Conference of the European Chapter of the Association for Computational Linguistics, 2020, arXiv:2004.13637v2 [cs.CL], Apr. 30, 2020, 25 pgs.

Serban et al., "Multiresolution Recurrent Neural Networks: An Application to Dialogue Response Generation", Proceedings of AAAI Conference on Artificial Intelligence, vol. 31, Jun. 2016, arXiv:1606.00776v2 [cs.CL], Jun. 14, 2016, 21 pgs.

Welleck et al., "Neural Text Degeneration With Unlikelihood Training", International Conference on Learning Representations, ICLR, Aug. 2019, arXiv:1908.04319v2 [cs.LG], Sep. 26, 2019, 17 pgs.

Weston et al., "Retrieve and Refine: Improved Sequence Generation Models for Dialogue", Proceedings of the 2018 EMNLP Workshop SCAI: The 2nd International Workshop on Search-Oriented Conversational AI, 2018, arXiv:1808.04776v2 [cs.CL], Sep. 6, 2018, 6 pgs.

Wu et al., "Response Generation by Context-aware Prototype Editing", The $33^{rd}$ AAAI Conference on Artificial Intelligence (AAAI-19), 2019, arXiv:1806.07042v4 [cs.CL], Nov. 16, 2018, 9 pgs., doi:10.1609/aaai.v33i01.33017281.

Yang et al., "A Hybrid Retrieval-Generation Neural Conversation Model", CIKM '19: Proceedings of the 28th ACM International Conference on Information and Knowledge Management, 2019, arXiv:1904.09068v1 [cs.IR], Apr. 19, 2019, 11 pgs., doi: 10.1145/3357384.3357881.

Zhang et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

Zhang et al., "Dialogpt: Large-Scale Generative Pre-training for Conversational Response Generation", Proceedings of the 58th Annual Meeting of the Association for Computational Linguistics, Jul. 5-10, 2020, pp. 270-278.

\* cited by examiner

METHOD OF GENERATING RESPONSE USING UTTERANCE AND APPARATUS THEREFOR

CROSS-REFERENCE TO RELATED APPLICATIONS

The current application claims the benefit of Korean Patent Application No. 10-2021-0157067, filed on Nov. 15, 2021, and Korean Patent Application No. 10-2022-0081325, filed on Jul. 1, 2022, in the Korean Intellectual Property Office, the disclosures of which are incorporated herein by reference.

FIELD OF THE INVENTION

The present disclosure generally relates to systems and methods directed to generating responses mimicking the conversational styles using utterances and apparatuses.

BACKGROUND

With the development of artificial intelligence technology, people may to communicate with chatbots as fictional characters rather than real people. Chatbots may search for and output predetermined response according to predetermined conversation topic, and/or may generate and output an appropriate response for a free conversation topic. A conversation in which a specific conversation topic may be not determined may be referred to as an open domain conversation.

Meanwhile, to implement a more attractive chatbot, research on chatbots that can have emotional conversations with and/or empathize with the other party beyond open domain conversations may be being conducted. Specifically, persona-grounded response generation research may be in progress, in which a fictional character may be set and a chatbot responds to the corresponding character. To respond like a specific character, the chatbots need to mimic the conversation style of the fictional character.

However, difficulties may exist in mimicking fictional characters using typical methods. First, it may be difficult to define a fictional character with just a few sentences. Second, it may be difficult to define a fictional character and conversation style in several discrete styles (e.g., happy, sad, and nervous). Third, it may be difficult to obtain a large amount of dialogue data of the fictional character for training a dialogue model mimicking the fictional character.

Using systems and methods of the forms disclosed herein may therefore enable the generation of responses mimicking conversational styles using utterances and apparatuses.

SUMMARY OF THE INVENTION

Systems and techniques generating responses using utterances and apparatus are illustrated. One embodiment includes a response generation method performed in an electronic apparatus. The response generation method acquires at least one piece of utterance data. The response generation method acquires a first context corresponding to the utterance data from a context candidate set. The response generation method generates one or more dialogue sets comprising the first context and the utterance data. The response generation method receives a second context from a user. The response generation method acquires a response corresponding to the second context using a language model based on the one or more dialogue sets.

In a further embodiment the acquiring of the response corresponding to the second context comprises acquiring the response corresponding to the second context by inputting a prompt comprising the second context and the one or more dialogue sets to the language model.

In another embodiment, the first context is acquired using a retrieval model based on the utterance data and the context candidate set.

In another embodiment, the acquiring of the first context involves acquiring a first score between the utterance data and a context included in the context candidate set using a retrieval model; and determining the first context from the context candidate set based on the first score.

In still another embodiment, the acquiring of the first context comprises acquiring a first score between the utterance data and a context included in the context candidate set using a retrieval model; acquiring a second score between the second context and a context included in the context candidate set using the retrieval model; and determining the first context from the context candidate set based on the first score and the second score.

In a further embodiment, the first score is a score related to an appropriateness of the first context for the utterance data, and the second score is a score related to a similarity between the first context and the second context.

In still another embodiment, the acquiring of the first context comprises determining a random context from the context candidate set to be the first context.

In another embodiment, the acquiring of the first context comprises acquiring the first context using a retrieval model comprising a bi-encoder mapping the first context and the utterance data.

In yet another embodiment, the at least one piece of utterance data comprises information on a personality and a language habit of a predetermined character.

In another embodiment, the response generation method further receives additional information associated with an utterance from the users; and acquires a response corresponding to the second context using the language model based on the additional information.

In a further embodiment, the additional information includes: information on at least one of a name, a gender, a personality, and a language habit of a predetermined character; and a plurality of preset dialogue sets related to the predetermined character.

In another embodiment, the first context corresponds to one of: a first-type context acquired based on a first score between the utterance data and a context included in the context candidate set; a second-type context acquired based on the first score and a second score between the second context and a context included in the context candidate set; and a third-type context arbitrarily selected from the context candidate set.

In a further embodiment, the acquiring of the response corresponding to the second context comprises acquiring the response based on a dialogue set comprising the first context corresponding to one of the first-type context, the second-type context, and the third-type context.

One embodiment includes an electronic apparatus for generating a response. The electronic apparatus includes a storage device; a communication device; and a controller comprising at least one processor. The controller is configured to: acquire at least one piece of utterance data through the storage device; acquire a first context corresponding to the utterance data from a context candidate set stored in the storage device; generate one or more dialogue sets comprising the first context and the utterance data; receive a second context from a user through the communication device; and acquire a response corresponding to the second context using a language model based on the one or more dialogue sets.

One embodiment includes a non-transitory computer-readable recording medium including a program to execute a response generation method in a computer. The response generation method acquires at least one piece of utterance data. The response generation method acquires a first context corresponding to the utterance data from a context candidate set. The response generation method generates one or more dialogue sets comprising the first context and the utterance data. The response generation method receives a second context from a user. The response generation method acquires a response corresponding to the second context using a language model based on the one or more dialogue sets.

One embodiment includes a response generation system using utterance data. The response generation system includes: a first storage in which a context candidate set is stored; a second storage in which utterance-related information is stored; a third storage in which a message input by a user is stored; and a server comprising a retrieval model and a generative model. The response generation system is configured to acquire at least one piece of utterance data through the second storage. The response generation system is configured to acquire, in the server, a first context corresponding to the utterance data from the context candidate set using the retrieval model. The response generation system is configured to generate, in the server, one or more dialogue sets comprising the first context and the utterance data. The response generation system is configured to acquire a second context through the third storage. The response generation system is configured to: acquire, in the server, a response corresponding to the second context based on the one or more dialogue sets using the generative model.

In a further embodiment, the utterance-related information includes information on at least one of a name, a gender, a personality, and a language habit of a predetermined character; and a plurality of preset dialogue sets related to the predetermined character.

BRIEF DESCRIPTION OF THE DRAWINGS

The description and claims will be more fully understood with reference to the following figures and data graphs, which are presented as exemplary embodiments of the disclosure and should not be construed as a complete recitation of the scope of the disclosure.

DETAILED DESCRIPTION

Figure 1:
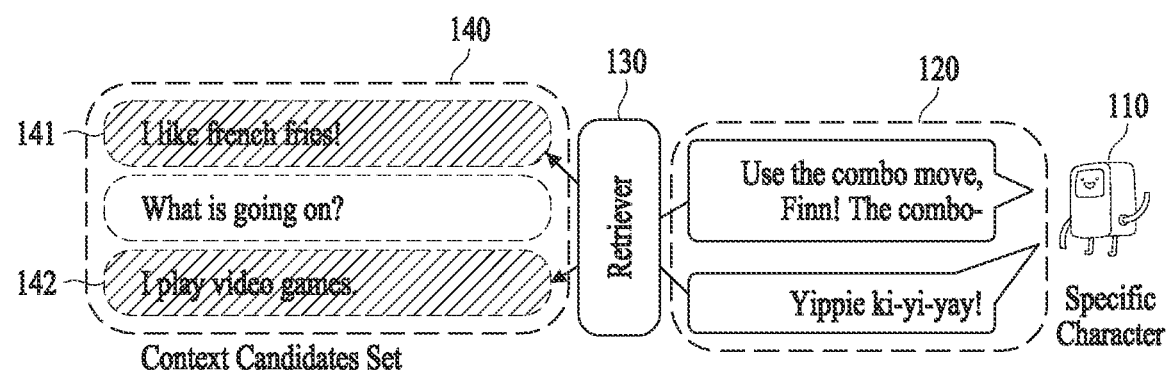
FIG. 1 is a diagram conceptually illustrating a method of acquiring a context corresponding to an utterance of a fictional character in accordance with many embodiments of the disclosure.

Turning now to the drawings, systems and methods for generating text responses, in accordance with various embodiments of the disclosure are illustrated. Terms used to illustrate many embodiments of the disclosure are selected as much as possible from general terms that are widely used at present while taking into consideration the functions obtained in accordance with numerous embodiments of the disclosure. In accordance with some embodiments, terms used herein may be replaceable by other terms based on the intentions of those skilled in the art, customs, emergence of new technologies, etc. Additionally or alternatively, in particular cases, terms that are not popularly applied may be used in the detailed description. Accordingly, it should be noted that the terms used herein should be construed based on practical meanings thereof and the whole content of this specification, rather than being simply construed based on the names of the terms. The terms "unit" and "module", for example, may refer to components that exert at least one function or operation, and may be realized in hardware and/or software. The term "terminal," as mentioned below, may be implemented as a computer and/or a portable terminal capable of accessing servers and/or other terminals through networks. Computers and computing devices may include, but are not limited to, laptop computers, desktop computers, and notebooks equipped with web browsers. Portable terminals may include, but are not limited to, wireless communication devices ensuring portability and mobility. Additionally or alternatively, portable terminals may refer to handheld wireless communication devices, including but not limited to tablet PCs, smartphones, and communication-based terminals such as international mobile telecommunication (IMT), code division multiple access (CDMA), W-code division multiple access (W-CDMA), and long term evolution (LTE).

In recent years, open-domain conversation models have achieved remarkable progress with the development of large-scale language models. Systems and methods implemented in accordance with some embodiments of the disclosure can be used to reflect desirable traits of real-life conversations to enhance open-domain conversation models. For example, style-controlling conversation models operating in accordance with many embodiments of the disclosure may generate responses that incorporate considerations including but not limited to emotion and empathy. Persona-grounded conversation models operating in accordance with several embodiments of the disclosure may produce responses that preserve consistent personalities by leveraging personal descriptions (e.g., "I have two dogs"). Models of these types may have applications including but not limited to mimicking fictional characters as a promising direction for building engaging conversation models.

For systems operating in accordance with a number of embodiments of the disclosure, tasks of open domain conversations can be studied using retrieval models and/or generative models. Generative models may use autoregressive decoding to generate responses based on given contexts. Retrieval models may search for responses related to given contexts in pre-defined response sets.

When building conversation models that mimic fictional characters, several challenges may prevent users from directly applying previous models designed for conditional response generation. First, they may face difficulty defining fictional characters with only a few descriptions, as in persona-grounded conversation models. As such, persona-grounded conversation models may not be expressive enough to represent characters' styles with discrete labels (e.g., angry, happy), as style-controlling conversation models do. Additionally or alternatively, systems operating in accordance with numerous embodiments of the disclosure may lack sufficient dialogue data of fictional characters utilized for training conversation models. In particular, manually creating dialogue datasets of characters for training may be inefficient, considering that additional data may be needed for each new character.

Systems and methods operating in accordance with many embodiments of the disclosure may address these issues, enabling them to generate responses mimicking fictional characters using only a few utterances of the fictional characters.

According to several embodiments, utterances of fictional characters can provide useful clues for generating responses mimicking characters. In particular, the personal traits and/or styles of speakers may be inherent in their utterances. Collecting only a few utterances of target characters may be a cost-effective scenario compared to constructing the full dialogue data consisting of context and utterance pairs. Through this, the response generation methods operating in accordance with some embodiments of the disclosure may extend to new characters easily.

Prompt engineering may be applied to optimize the information obtained from conversation models. A generative pre-trained transformer 3 (GPT-3) may refer, in this disclose, to an autoregressive language model that uses deep learning to create human-like texts. From this, prompt engineering techniques can be utilized to effectively use the knowledge of huge language models. The prompt of prompt engineering may include task descriptions of tasks to be performed by models. Few-shot learning methods guided by instructions, may be used to demonstrate how models can perform tasks through prompt engineering. Specifically, when few-shot examples of a problem to be solved are input to a huge language model in advance, the huge language model may solve the problem without a separate learning process. Systems operating in accordance with various embodiments of the disclosure may use few-shot learning methods without needing to require a large amount of dialogue data.

Generating Responses for Conversation Models

In accordance with several embodiments of the disclosure, the power of pre-trained large-scale language models may be leveraged to perform response generation based on utterance data. To this end, dialogue-type prompts may be built using a few numbers of target characters' utterances. In this application, methods that build dialogue-type prompts using target characters' utterances to leverage the large-scale language models may be referred to as pseudo dialog prompting (PDP). Designing the dialogue-type prompts that include the characters' utterances as dialogue history may be effective for extracting and reflecting the style of the character. For this, an utterance-related context is selected from a predefined set of context candidates using a retrieval model, and each utterance is matched with an appropriate pseudo-context. Through human and automatic evaluations, whether the method, operating in accordance with some embodiments, generates responses that better reflect the style of fictional characters than existing baseline models may be verified.

In the following description, example implementations may be described in detail with reference to the drawings so that those skilled in the art can easily carry out operations in accordance with many embodiments of the disclosure. However, the systems and methods illustrated in this application may be implemented in various different forms and are not limited to the exemplary embodiments described herein. In addition, terms such as "first" and "second" are only used to distinguish one element from another element, and these elements are not to be limited by these terms.

A diagram illustrating a method of acquiring a context corresponding to an utterance of a fictional character according to some embodiments of the disclosure is illustrated in FIG. 1. In accordance with some system implementations, conversation agents may be modeled while mimicking arbitrary characters with k utterances $\{u_1, u_2, \ldots, u_k\}$ of the characters. The conversation agents may be used to generate a response r corresponding to a given context x. Methods may design prompts with the characters' utterances by concatenating utterances. However, such methods may generate comparatively dull responses that do not reflect the styles of the character. Since the prompt format that simply connects the utterance is unlikely to have appeared naturally in the training set, it can be assumed that the language model does not utilize the utterances.

Response generation methods operating in accordance with some embodiments of the disclosure can build dialogue-type prompts where character utterances are included in the dialogue history.

Since speakers tend to maintain consistent styles throughout conversations, using such prompts may induce the language model to generate responses that seamlessly reflect the style from the characters' utterances. To build a dialogue when only given the utterances of the character, a pseudo-context $c_i$ matching each utterance $u_i$ may be used to acquire a context-utterance pair $(c_i, u_i)$. In accordance with various embodiments, bi-encoders may be used as a retriever R, which is a retrieval-based open domain conversation model, to acquire pseudo-contexts $c_i$. First, a fixed set of context candidates C obtained from the dialogue dataset, for example, a blended skill talk (BST) may be defined. Then, the pseudo-context $c_i$ for the given utterance $u_i$ may be selected using R. A bi-encoder model may map the context c and the response r into the embedding space as ectx(c) and eresp(r), respectively using separate encoders.

Referring to FIG. 1, at least one piece of utterance data 120 may be acquired for a fictional character 110. FIG. 1 shows "Use the combo move, Finn! The Combo-" and "Yippie ki-yi-yay!", which are utterances of a fictional character 'BMO', as utterance data. In addition, a retriever 130 may be used to acquire contexts 141 and 142 corresponding to the utterance data 120 of the character 110 from a context candidate set 140. As illustrated in FIG. 1, a context "I like French fries!" may be retrieved for an utterance "Yippie ki-yi-yay!", and a context "I play video games" may be retrieved for an utterance "Use the combo move, Finn! The Combo-" as a corresponding context.

In accordance with a number of embodiments, the context candidate set may be a collection of contexts extracted from several arbitrary dialogue sets and may be a collection of phrases made up of spoken words among several dialogue sets. The context candidate set may be set dynamically, and data addition and supplementation may be performed dynamically.

Figure 2:
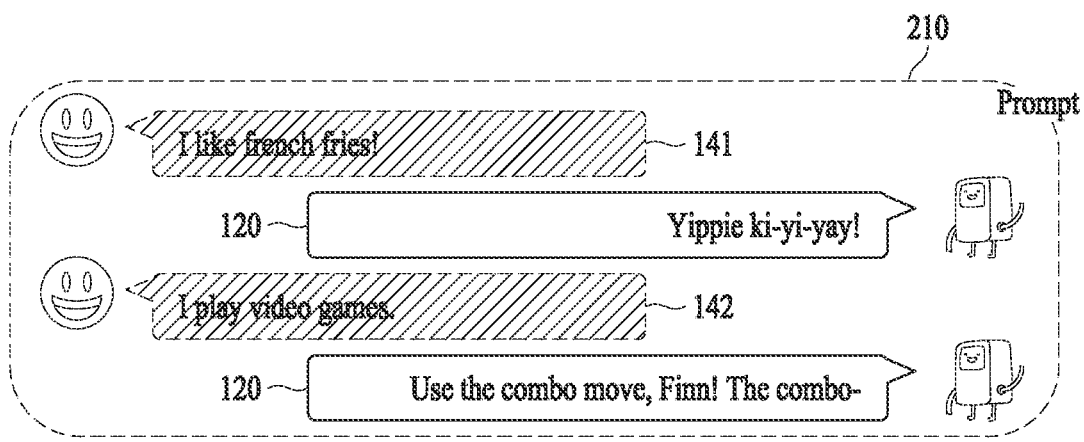
FIG. 2 is a diagram conceptually illustrating a method of generating an utterance-context dialogue set in accordance with some embodiments of the disclosure.

A diagram illustrating a method of generating an utterance-context dialogue set according to various embodiments is illustrated in FIG. 2. In FIG. 1, the contexts 141 and 142 corresponding to the utterance data 120 may be acquired from the context candidate set 140, and then configured as utterance-context dialogue sets. In various embodiments, prompts 210 configured to be used for language models may be constructed using one or more dialogue sets. By constructing the prompts 210 in a form of dialogue, the language model may more appropriately apply utterances of a character.

Figure 3:
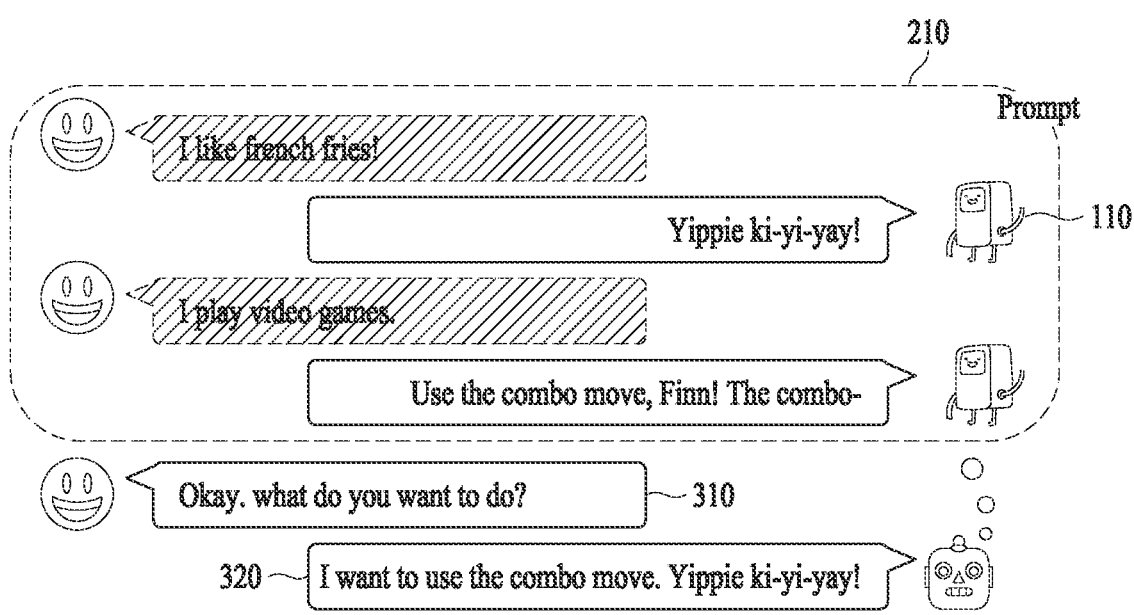
FIG. 3 is a diagram conceptually illustrating a method of outputting a response to a given context using a prompt constructed in a form of dialogue in accordance with numerous embodiments of the disclosure.

A method of outputting responses to a given context using a prompt constructed in a form of dialogue, in accordance with many embodiments of the disclosure, is illustrated in FIG. 3. A language model may acquire a response 320 corresponding to a given context using the prompt 210 including the one or more dialogue sets described in FIG. 2. In FIG. 3, the response 320 "I want to use the combo move. Yippie ki-yi-yay!", which the fictional character 110 may answer in response to the given context 310 "Okay. What do you want to do?", may be output.

In accordance with various embodiments, the pseudo-context $c_i$ may be selected for the given utterance $u_i$ using several methods. First, the retrieval model R may be used to select the pseudo-context $c_i$ which may more consistently precede compared to the given utterance $u_i$. When $u_i$ is given, R may calculate a score $s_{stat}$ for the context c included in the context candidate set C using Equation 1.

$$s_{stat}(c;u_i)=e_{ctx}(c) \cdot e_{resp}(u_i) \quad \text{[Equation 1]}$$

wherein • denotes a dot product, and $e_{ctx}(c)$ and $e_{resp}(u_i)$ denote values obtained by mapping the context c and the utterance $u_i$ into an embedding space using a bi-encoder model. In accordance with many some embodiments, R may return c having the highest score $s_{stat}$ as the pseudo-context $c_i$ corresponding to $u_i$. The pseudo-context $c_i$ selected through this process depends on the given utterance $u_i$ only and thus, such methods may be referred to as a "static method."

In accordance with some embodiments, the pseudo-context $c_i$ may be selected based on an input context x. Meanwhile the utterance, $u_i$, may be obtained by receiving the context x in addition to the fixed set C of context candidates. When x and $u_i$ are given, the retrieval model R may calculate a score $s_{dyn}$ for the context c included in the context candidate set C using Equation 2.

$$s_{dyn}(c;x,u_i)=e_{ctx}(c) \cdot e_{ctx}(x)+s_{stat}(c;u_i) \quad \text{[Equation 2]}$$

wherein denotes a dot product, and $e_{ctx}(c)$ and $e_{ctx}(x)$ denote values obtained by mapping the context c and the input context x into the embedding space using the bi-encoder model. In accordance with numerous embodiments, R may return c having the highest score $s_{dyn}$ as the pseudo-context $c_i$ corresponding to $u_i$. A language model may quickly adapt to the context-response mapping of a given prompt through in-context learning. Thus, as above, when the pseudo-context is semantically similar to the input context provided, the style may be easily reflected in the corresponding utterance. Such methods may be referred to as a "dynamic method" since the pseudo-context $c_i$ depends on various input contexts x.

In accordance with many embodiments, instead of using the retrieval model R, the pseudo-context $c_i$ may be randomly selected from the context candidate set C. Such methods may be used to verify quality effects of the pseudo-context $c_i$ selected by the above-described two methods (e.g., static and dynamic methods). This method may be referred to as a "random method" since the pseudo-context $c_i$ is randomly selected.

In accordance with several embodiments, a score for the context c may be tuned using a weight adjustment method. For example, when the context c, having the highest score $s_{dyn}$, is not a context appropriate for an evaluation result utterance, a more appropriate context may be acquired by increasing a weight for the score $s_{stat}$ or increasing a weight for $e_{ctx}(x)$.

In accordance with a number of embodiments, a dialogue set may be obtained that includes, but is not limited to, a context acquired based on one of the static, dynamic, and random methods. Accordingly, the language model may be trained based on the dialogue set including a context acquired based on one of the static, dynamic, and random methods and used to generate a response. For example, a response output to correspond to a given context in a conversation with the chatbot may be generated using one or more of contexts the acquired based on one of the static, dynamic, and random methods. Accordingly, a portion of the conversation conducted with the chatbot may be a response based on a response based on the static method, a response based on the dynamic method, or a response based on the random method.

In accordance with various embodiments, a method of generating a response based on a preceding input context during a conversation with the chatbot may be selected. For example, when a current given context is associated with a previously input context, a response may be generated based on a dialogue set including a context acquired through the dynamic method. When the current given context includes a similar gist to that of the previously input context (for example, when a context for "What did you eat?" is given after a context "Did you eat lunch?"), or when an utterance style of the current given context is similar to the previously input context (for example, when a context like "I'm just fine and dandy." is given after a context for "Howdy!"), the language model may generate a response based on a dialogue set including a context acquired through the dynamic method.

For response generation models implemented in accordance with certain embodiments of the disclosure, model performance may be verified based on the response and dialogue context. Specifically, model performances may be verified depending on whether model responses reflect a style of a given character and whether the model consistently answers to given dialogue contexts. For this, both human and automatic evaluations may be used to show a degree of style reflection and a conversation consistency.

Response generation models, operating in accordance with some embodiments of the disclosure, may show efficient automatic metrics and style-reflecting metrics for human evaluation. A difference between dialogue-type prompts generated using the response generation models, operating according to certain embodiments, and prompts including only an utterance may be encapsulated by the presence of pseudo-contexts. As such, the dialogue-type prompts may be more effective in reflecting the characters' utterance styles. Specifically, when prompts generated using the static method are used, high response consistency and response appropriateness may be achieved. Meanwhile, when prompts generated using the dynamic method are used, a highest performance may be achieved in the style-reflecting metric.

In accordance with many embodiments, the users who interacts with the chatbot may directly evaluate the static, dynamic, and random methods, and determine a method customized for users based on the users' evaluation results. For example, high ratings may be given to responses that are appropriate for the context and reflect characteristics of the character well. In the above example, when the response is based on the static method, for the corresponding user(s), the responses may be generated by increasing a weight of the static method.

Figure 4:
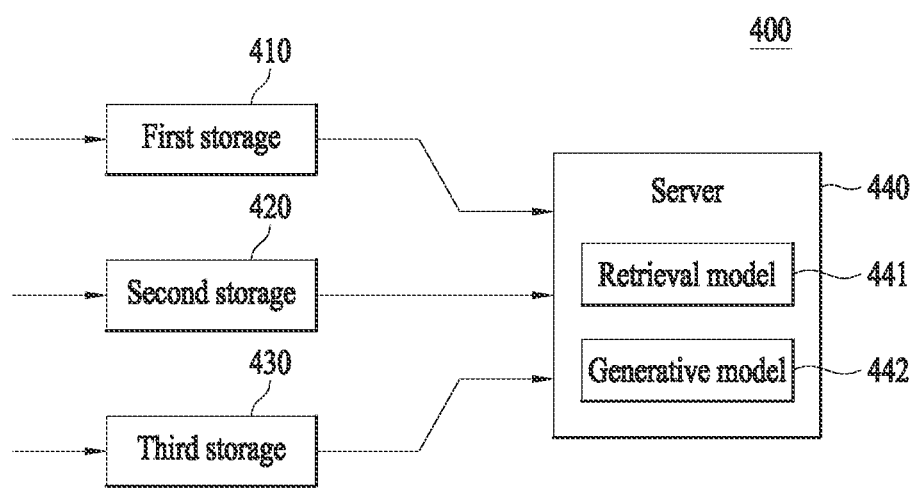
FIG. 4 is a diagram illustrating a structure of a response generation system in accordance with various embodiments of the disclosure.

A diagram illustrating a response generation system according to certain embodiments of the disclosure is illustrated in FIG. 4. A response generation system 400 may be a system for generating dialogue-type prompts using a response generation method according to certain embodiments of the disclosure and acquiring a response to a given context. In accordance with a number of embodiments, the response generation system 400 may include, but is not limited to, a first storage 410, a second storage 420, a third storage 430, and a server 440. The server 440 may include, but is not limited to, a retrieval model 441 and a generative model 442. FIG. 4 illustrates an example that is merely for briefly showing a structure of the response generation system 400, is not necessarily limited to the configuration shown in the drawing, and may further include more elements. In addition, the first storage 410, the second storage 420, and the third storage 430 may be separate storage spaces independent of one another, may be divided storage spaces in one storage based on a type or characteristics of data stored, or may be conceptually divided based on functions related to response generation, instead of being physically divided.

In accordance with several embodiments, the first storage 410 may store a context candidate set, while the second storage 420 may store utterance-related information. The utterance-related information may include information on at least one of a name, a gender, a personality, and a language habit of a predetermined character and a plurality of preset dialogue sets related to the predetermined character. The plurality of preset dialogue sets related to the predetermined character may include, but is not limited to, a prompt constructed through the server 440 in advance. Alternatively or additionally, the dialogue sets may include, but are not limited to, a plurality of context-response pairs set by users in advance. For example, users may realize personas of predetermined characters by setting at least one of the names, genders, personalities, and language habits of the predetermined characters.

Based on the personas, the users may create pluralities of context-response pairs in a form of QnAs by composing a question and a character's response expected to the question. Based on the information stored in the first storage 410 and the second storage 420, servers 440 may construct dialogue-type prompts and/or acquire responses corresponding to given contexts. In accordance with some embodiments, the servers 440 may include, but are not limited to, Triton servers.

In accordance with a number of embodiments, response generation systems 400 may acquire at least one piece of utterance data through the second storage 420. Additionally, response generation systems 400 may acquire pseudo-contexts corresponding to the utterance data from the context candidate set of the first storage 410 using the retrieval model 441 in the server(s) 440. In addition, one or more dialogue sets including the pseudo-context and the utterance data may be generated in the server(s) 440. Meanwhile, a message input by the users, that is, a new context may be transmitted to the third storage 430. Through this, a response corresponding to the input message may be acquired based on the one or more dialogue sets using the generative model 442 in the server 440.

In accordance with many embodiments, personas may be set in various ways. For example, to create the persona of the predetermined character(s), users may input the characters' names, ages (e.g., date of birth), genders, personalities, interests, and relationships with the users (e.g., lover, friendship, pet and owner, etc.) to the second storages 420 of the response generation systems 400. Such input methods may be implemented in text input formats, increasing customizing freedom. Additionally or alternatively, the personas may be set in form of QnA in which the users input questions and expected responses of the character(s) and/or the corresponding characteristic of the character. In addition, the character may be implemented based on the persona stored in the second storage 420 so that the persona of the characters may be reflected when generating responses.

In accordance with numerous embodiments, inputting character persona information in the form of QnAs may be effective for implementing fictional characters in detail. Users may convert conversations, had with the character for which the personas are being set, into questions. In such processes, the response generation systems 400 may display portions of histories of conversations with the characters as suggested questions so as to be viewed by the users. Additionally or alternatively, QnA sets may be created by users inputting expected answers, from a character to a question, wherein the expected answers are selected based on conversation histories. Additionally or alternatively, the users may directly input desired questions to be heard from characters. In some cases, QnA sets may be created by users inputting the expected answer of the character for each question. The created QnA sets may be added as data input when the generative models 442 are utilized.

In accordance with various embodiments, generative models 442 may generate responses based on dialogue-type prompts generated through retrieval models 441. In accordance with many embodiments of the disclosure, generative models 442 may generate responses based on QnA inputs by users. Additionally or alternatively, dialogue history information of conversations between users and chatbots may be taken into consideration. Through this, when new messages are input, the generative models 442 may output responses that better reflects the persona input.

In accordance with some embodiments, the users may interact with respect to responses they like among responses output by the chatbots. Responses selected by users may be further taken into consideration when the generative models 442 generate responses, and through this, may generate responses that better reflect the personas.

Figure 5:
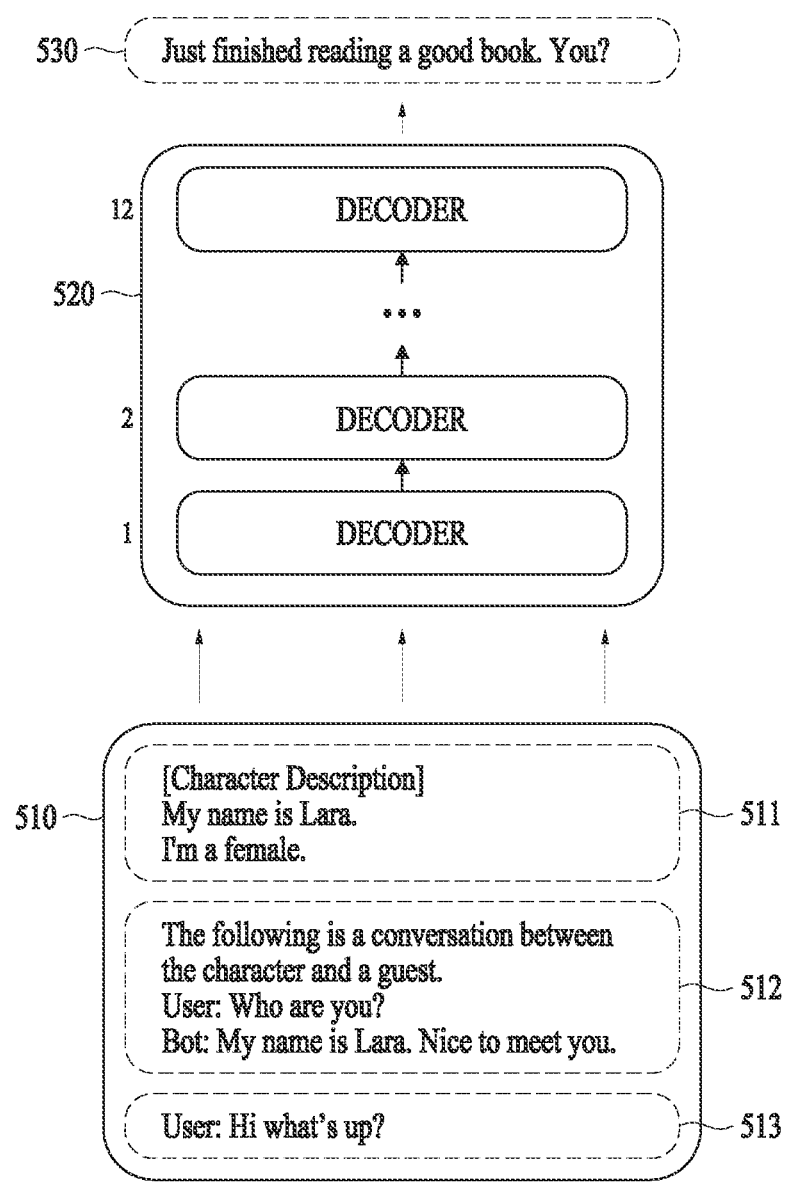
FIG. 5 is a diagram illustrating a process of acquiring a response based on a prompt in accordance with certain embodiments of the disclosure.

A process of acquiring a response based on a prompt according to various embodiments of the disclosure is conceptually illustrated in FIG. 5. In accordance with a number of embodiments, prompts 510 may include, but are not limited to, one or more dialogue sets, each of which may correspond a context-utterance pair. As described above, the prompts 510 may include, but are not limited to, pseudo-context-utterance conversation sets including pairs of character utterances and pseudo-contexts.

In addition, the prompts 510 may include, but are not limited to, personas 511 of fictional characters, description information 512 (including anticipated questions and characters' expected answers), and dialogue history information 513 including newly input context. In accordance with numerous embodiments, the description information 512 may include, but is not limited to, QnAs in which the users input expected responses that the characters may have answered to the questions. Additionally or alternatively, as described with reference to FIGS. 1 through 4, the description information 512 may include, but is not limited to, pseudo-context-utterance pairs in the form of dialogue sets acquired using retrieval models.

In accordance with many embodiments, users may create a plurality of QnAs. The retrieval models may search for QnAs appropriate for the newly input context, and include them into the description information 512. At this time, the plurality of QnAs may be filtered and selected based on similarity between questions and an input context. Alternately or additionally, the plurality of QnAs may be filtered and selected based on style reflection metrics of answers.

In accordance with certain embodiments of the disclosure, generative models may generate responses 530 corresponding to input context through a plurality of decoders 520 using the prompts 510. Referring to FIG. 5, "My name is Lara. I'm a female." may be input to the persona 511 of the fictional character. "The following is a conversation between the character and a guest. User: Who are you? Bot: My name is Lara. Nice to meet you." may be input as the description information 512. "User: Hi what's up?" corresponding to the newly input context may be input as the dialogue history information 513. Through this, the prompt 510 can be constructed. Correspondingly, the generative model may then create "Just finished reading a good book. You?" as a response to the input context "Hi what's up?".

Figure 6:
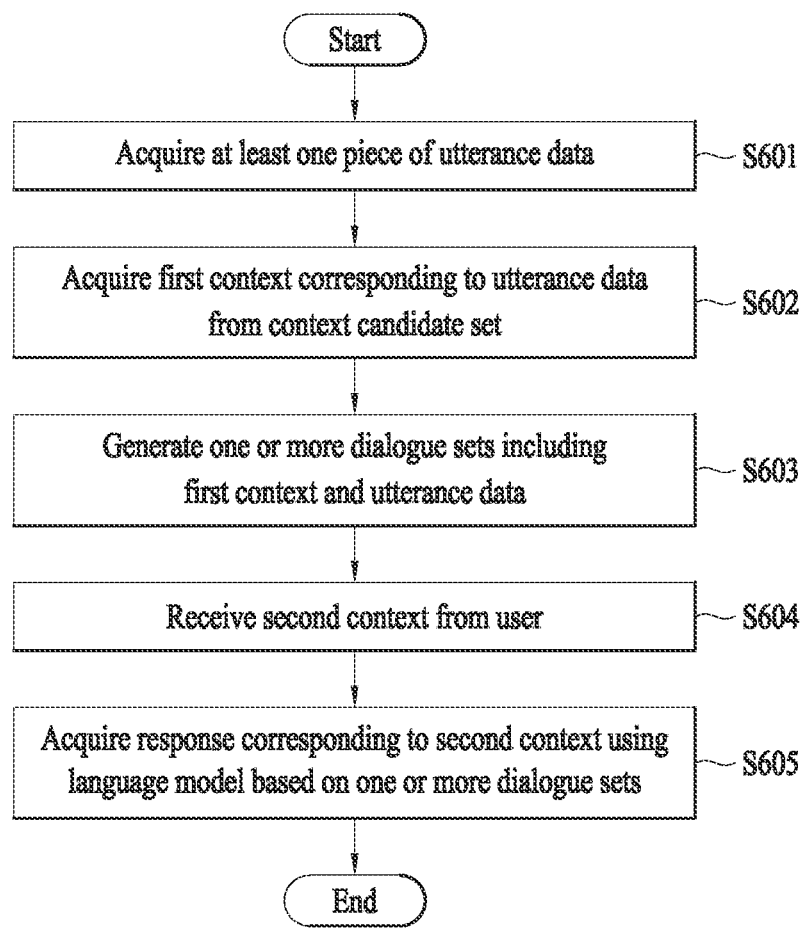
FIG. 6 is a flowchart conceptually illustrating a response generation method in accordance with a number of embodiments of the disclosure.

An example response generation method operating in accordance with certain embodiments of the disclosure is illustrated in FIG. 6. In operation S601, at least one piece of utterance data may be acquired. In accordance with various embodiments, the at least one piece of utterance data may include information on a personality and a language habit of a predetermined character.

In operation S602, a first context corresponding to the utterance data may be acquired from a context candidate set. In accordance with a number of embodiments, the first context may be acquired using a retrieval model based on the utterance data and the context candidate set. For example, a first score between the utterance data and a context included in the context candidate set may be acquired using a retrieval model, and the first context may be determined from the context candidate set based on the first score. In addition, a second score between the second context and a context included in the context candidate set may be additionally acquired using the retrieval model, so that the first context is determined from the context candidate set based on the first score and the second score. In accordance with many embodiments, the first score may be a score related to an appropriateness of the first context for the utterance data, and the second score may be a score related to a similarity between the first context and the second context.

The first context may be acquired by determining a random context from the context candidate set to be the first context. In accordance with some embodiments, the retrieval model may include, but is not limited to, a bi-encoder mapping the first context and the utterance data. In accordance with numerous embodiments, the first context may correspond to one of a first-type context acquired based on the first score, a second-type context acquired based on the first score and the second score, and a third-type context arbitrarily selected from the context candidate set. Accordingly, in an operation of acquiring a response corresponding to the second context, referring to operation S605, the response may be acquired based on a dialogue set including the first context corresponding to one of the first-type context, the second-type context, and the third-type context.

In operation S603, one or more dialogue sets including the utterance data and the first context may be generated. In accordance with various embodiments, a prompt including one or more dialogue sets may be constructed.

In operation S604, a second context may be received from users. In operation S605, a response corresponding to the second context may be acquired using a language model based on the one or more dialogue sets.

In accordance with a number of embodiments, the response corresponding to the second context may be acquired by inputting a prompt including the second context and the one or more dialogue sets to the language model.

In accordance with many embodiments, additional information associated with an utterance may be received from the users, and the response corresponding to the second context may be acquired using the language model based on the additional information. The additional information may include information on at least one of the names, genders, personalities, language habits of predetermined characters, and a plurality of preset dialogue sets related to the predetermined characters.

Figure 7:
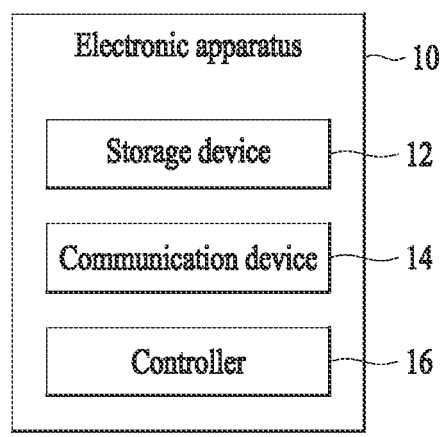
FIG. 7 is a block diagram illustrating an electronic apparatus for generating responses based on an utterance in accordance with several embodiments of the disclosure.

An electronic apparatus 10 for generating a response based on an utterance, according to certain embodiments, is illustrated in FIG. 7. In accordance with some embodiments, the electronic apparatus 10 may include, but is not limited to, a storage device 12, a communication device 14, and a controller 16, and is not to be taken as being limited thereto.

Storage devices 12 may store a context and a response required for open-domain conversation. In addition, the storage devices 12 may each include, but are not limited to, one or more context candidate sets acquired from arbitrary dialogue data and utterance data related to fictional characters. The storage devices 12 may be hardware for storing various data processed in the electronic apparatus 10, and/or may store programs for processing and control of the controller 16. The storage devices 12 may include, but are not limited to, a random access memory (RAM) such as a dynamic random access memory (DRAM), a static random access memory (SRAM), or the like, a read-only memory (ROM), an electrically erasable programmable read-only memory (EEPROM), a CD-ROM, a Blu-ray, another optical disk storage, a hard disk drive (HDD), a solid state drive (SSD), and/or a flash memory.

Communication devices 14 may communicate with external electronic apparatuses using wired and/or wireless communication technology and may include, but are not limited to, transceivers. For example, communication devices 14 may enable communication between an electronic apparatus 10 and a user terminal. The external electronic device may be a terminal or a server. In addition, the communication technology used by the communication device 14 may include, for example, global system for mobile communication (GSM), code division multi-access (CDMA), long term evolution (LTE), fifth-generation (5G), wireless LAN (WLAN), wireless-fidelity (Wi-Fi), Bluetooth, radio frequency identification (RFID), infrared data association (IrDA), ZigBee, near field communication (NFC), or the like, but not be limited thereto.

Controllers 16 may control overall operations of electronic apparatuses 10, process data, and/or process signals. In many embodiments, controllers 16 may include, but is not limited to, at least one processor. In accordance with a number of embodiments, controllers 16 may acquire at least one piece of utterance data through a storage device 12, acquire a first context corresponding to utterance data from a context candidate set, and generate one or more dialogue sets including the first context and the utterance data. Additionally or alternatively, controllers 16 may receive second contexts from user terminals through communication devices 14. Additionally or alternatively, controllers 16 may acquire responses corresponding to the second context using language models based on the one or more dialogue sets.

Apparatuses operating in accordance with several of the above-described embodiments may include, but are not limited to, a processor, a memory which stores and executes program data, a permanent storage such as a disk drive, a communication port for communication with an external device, and user interface devices such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

Systems in accordance with many embodiments of the disclosure may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include the meaning of a series of routines of software in association with a processor, for example.

Systems and techniques directed towards generating, in accordance with various embodiments of the disclosure, are not limited to use in generating chatbot responses. Accordingly, any of the systems and methods described herein with reference to FIGS. 1-7 can be implemented outside the contexts described above.

The above-described embodiments are merely examples and other embodiments may be implemented within the scope of the following claims. While the above description contains many specific embodiments of the disclosure, these should not be construed as limitations on the scope of the disclosure, but rather as an example of one embodiment thereof. Accordingly, the scope of the disclosure should be determined not by the embodiments illustrated, but by the appended claims and their equivalents.

What is claimed is:

1. A response generation method performed in an electronic apparatus, the response generation method comprising:
   acquiring utterance data;
   acquiring a first score between the utterance data and a context included in a context candidate set using a retrieval model, wherein the first score is a score related to an appropriateness of a first context for the utterance data;
   determining the first context from the context candidate set based on the first score;
   generating one or more dialogue sets comprising the first context and the utterance data;
   receiving a second context from a user; and
   acquiring a response corresponding to the second context using a language model based on the one or more dialogue sets.

2. The response generation method of claim 1, wherein the acquiring of the response corresponding to the second context comprises acquiring the response corresponding to the second context by inputting a prompt comprising the second context and the one or more dialogue sets to the language model.

3. The response generation method of claim 1, wherein the acquiring of the first context comprises:
   acquiring a second score between the second context and a context included in the context candidate set using the retrieval model, wherein the first context is determined from the context candidate set further based on the second score.

4. The response generation method of claim 3, wherein the second score is a score related to a similarity between the first context and the second context.

5. The response generation method of claim 1, wherein the retrieval model comprises a bi-encoder for mapping the first context and the utterance data.

6. The response generation method of claim 1, wherein the utterance data comprises information on a personality and a language habit of a predetermined character.

7. The response generation method of claim 1, further comprising:
   receiving additional information associated with an utterance from the user; and
   acquiring a response corresponding to the second context using the language model based on the additional information.

8. The response generation method of claim 7, wherein the additional information comprises:
   information on at least one of a name, a gender, a personality, and a language habit of a predetermined character; and
   a plurality of preset dialogue sets related to the predetermined character.

9. The response generation method of claim 1, wherein the response is acquired based on a dialogue set comprising the first context.

10. An electronic apparatus for generating a response, the electronic apparatus comprising:
    a storage device;
    a communication device; and
    a controller comprising at least one processor, wherein the controller is configured to
       acquire utterance data through the storage device;
       acquire a first score between the utterance data and a context included in a context candidate set using a retrieval model, wherein the first score is a score related to an appropriateness of a first context for the utterance data;

determine the first context from the context candidate set based on the first score;

generate one or more dialogue sets comprising the first context and the utterance data;

receive a second context from a user through the communication device; and acquire a response corresponding to the second context using a language model based on the one or more dialogue sets.

11. A non-transitory computer-readable recording medium comprising a program to execute a response generation method in a computer, the response generation method comprising:

acquiring utterance data;

acquiring a first score between the utterance data and a context included in a context candidate set using a retrieval model, wherein the first score is a score related to an appropriateness of a first context for the utterance data;

determining the first context from the context candidate set based on the first score;

generating one or more dialogue sets comprising the first context and the utterance data;

receiving a second context from a user; and acquiring a response corresponding to the second context using a language model based on the one or more dialogue sets.

12. A response generation system for using utterance data, the response generation system comprising:

a first storage in which a context candidate set is stored;

a second storage in which utterance-related information is stored;

a third storage in which a message input by a user is stored; and a server comprising a retrieval model and a generative model, wherein the response generation system is configured to
acquire utterance data through the second storage;

acquire a first score between the utterance data and a context included in the context candidate set using a retrieval model, wherein the first score is a score related to an appropriateness of a first context for the utterance data;

determine the first context from the context candidate set based on the first score;

generate, in the server, one or more dialogue sets comprising the first context and the utterance data;

acquire a second context through the third storage; and acquire, in the server, a response corresponding to the second context based on the one or more dialogue sets using the generative model.

13. The response generation system of claim 12, wherein the utterance-related information comprises:

information on at least one of a name, a gender, a personality, and a language habit of a predetermined character; and a plurality of preset dialogue sets related to the predetermined character.

* * * * *